(12) United States Patent
Bernard et al.

(10) Patent No.: US 12,188,837 B2
(45) Date of Patent: Jan. 7, 2025

(54) COMPOSITE COMPONENTS WITH IMPACT DETECTION

(71) Applicant: Crompton Technology Group Limited, Solihull (GB)

(72) Inventors: James Bernard, Brackley (GB); Alexander D. Taylor, Oxfordshire (GB); Paul Daniel Liddel, Oxfordshire (GB); Jon Pethick, Leicestershire (GB); Jashen Litesh, Middlesex (GB); Myrto Angeliki Matzakou, Warwickshire (GB); Nathaniel M. Gray, Stratham, NH (US)

(73) Assignee: CROMPTON TECHNOLOGY GROUP LIMITED, Solihull (GB)

( * ) Notice: Subject to any disclaimer, the term of this patent is extended or adjusted under 35 U.S.C. 154(b) by 718 days.

(21) Appl. No.: 16/713,827

(22) Filed: Dec. 13, 2019

(65) Prior Publication Data
US 2021/0102855 A1     Apr. 8, 2021

(30) Foreign Application Priority Data
Oct. 4, 2019   (EP) ..................................... 19386041

(51) Int. Cl.
*G01L 5/00*     (2006.01)
*B29C 45/00*    (2006.01)
(Continued)

(52) U.S. Cl.
CPC ............ *G01L 5/0052* (2013.01); *B32B 33/00* (2013.01); *C08J 5/04* (2013.01); *B29C 45/0005* (2013.01);
(Continued)

(58) Field of Classification Search
CPC .......... G01L 5/0052; B32B 33/00; C08J 5/04; B29C 45/0005; B29K 2071/00; B29K 2105/12; B29K 2307/04; Y10T 428/24479
See application file for complete search history.

(56) References Cited

U.S. PATENT DOCUMENTS

| 3,428,507 A | 2/1969 | Eric |
| 4,917,938 A | 4/1990 | Mohan |

(Continued)

FOREIGN PATENT DOCUMENTS

| CN | 106158171 A | * 11/2016 | ......... B29C 45/0005 |
| DE | 19850462 A1 | 5/2000 | |

(Continued)

OTHER PUBLICATIONS

Translation of CN106158171A. (Year: 2016).*
(Continued)

*Primary Examiner* — Catherine A. Simone
(74) *Attorney, Agent, or Firm* — CANTOR COLBURN LLP

(57) ABSTRACT

A fiber-reinforced polymer composite component formed from a polymer matrix material containing fiber reinforcement. The component comprises a main portion and at least one raised feature extending from a surface plane s of said main portion. The at least one raised feature is arranged to incur visually perceptible damage when the component is subject to an impact with an energy above a predetermined impact energy threshold and to resist an impact with an energy below the predetermined impact energy threshold.

16 Claims, 8 Drawing Sheets

(51) Int. Cl.
    *B29K 71/00*     (2006.01)
    *B29K 105/12*     (2006.01)
    *B29K 307/04*     (2006.01)
    *B32B 33/00*     (2006.01)
    *C08J 5/04*     (2006.01)

(52) U.S. Cl.
    CPC ...... *B29K 2071/00* (2013.01); *B29K 2105/12* (2013.01); *B29K 2307/04* (2013.01); *Y10T 428/24479* (2015.01)

(56) References Cited

U.S. PATENT DOCUMENTS

| | | |
|---|---|---|
| 5,108,678 A | 4/1992 | Hirasaka |
| 5,437,311 A | 8/1995 | Reynolds |
| 7,281,597 B2 | 10/2007 | Pellillo et al. |
| 7,565,778 B2 | 7/2009 | Azeau |
| 8,689,644 B2 | 4/2014 | Dubost |
| 8,944,225 B2 | 2/2015 | Wuest et al. |
| 9,274,036 B2 | 3/2016 | Malik et al. |
| 9,334,039 B2 | 5/2016 | Kaye et al. |
| 9,586,621 B2 | 3/2017 | Fodor |
| 9,592,853 B2 | 3/2017 | Aitharaje et al. |
| 9,834,649 B1 | 12/2017 | Kinnan |
| 10,059,382 B2 | 8/2018 | Nusier et al. |
| 10,293,770 B2 | 5/2019 | Owens et al. |
| 10,309,570 B2 | 6/2019 | Gonzalez Bayon et al. |
| 2006/0234007 A1 | 10/2006 | Durand et al. |
| 2007/0119363 A1 | 5/2007 | Neto et al. |
| 2008/0087768 A1 | 4/2008 | Lloyd |
| 2011/0150602 A1 | 6/2011 | Sieper et al. |
| 2011/0220006 A1 | 9/2011 | Kaye et al. |
| 2013/0108828 A1 | 5/2013 | Cantrell et al. |
| 2013/0183087 A1 | 7/2013 | Weibel et al. |
| 2014/0024741 A1 | 1/2014 | Strobel et al. |
| 2015/0102524 A1 | 4/2015 | Hubauer |
| 2015/0266260 A1* | 9/2015 | Fujioka ............. B32B 3/26 428/116 |
| 2016/0159453 A1 | 6/2016 | Korenaga et al. |
| 2016/0377424 A1 | 12/2016 | Clark |
| 2017/0100911 A1 | 4/2017 | Kwon et al. |
| 2017/0173629 A1 | 6/2017 | Senani et al. |
| 2017/0241465 A1* | 8/2017 | Ikada ............. F16B 33/006 |
| 2018/0117859 A1 | 5/2018 | Carlson et al. |
| 2019/0048962 A1 | 2/2019 | Wuest |
| 2019/0061309 A1 | 2/2019 | Kwon |
| 2019/0061310 A1 | 2/2019 | Kwon |
| 2019/0368645 A1 | 12/2019 | Bernard et al. |
| 2020/0278059 A1 | 9/2020 | Forbes et al. |
| 2021/0102862 A1 | 4/2021 | Bernard et al. |

FOREIGN PATENT DOCUMENTS

| | | |
|---|---|---|
| DE | 202015006737 U1 | 10/2015 |
| EP | 1582796 A2 | 10/2005 |
| EP | 2335908 A1 | 6/2011 |
| EP | 3575071 A1 | 12/2019 |
| GB | 2177883 A | 2/1987 |
| WO | 2009087372 | 7/2009 |

OTHER PUBLICATIONS

European Search Report for Application No. 19386040.0, mailed Mar. 25, 2020, 7 pages.

Extended European Search Report for International Application No. 18275073.7 dated Dec. 6, 2018, 8 pages.

European Search Report for Application No. 19386041.8, mailed Mar. 25, 2020, 7 pages.

* cited by examiner

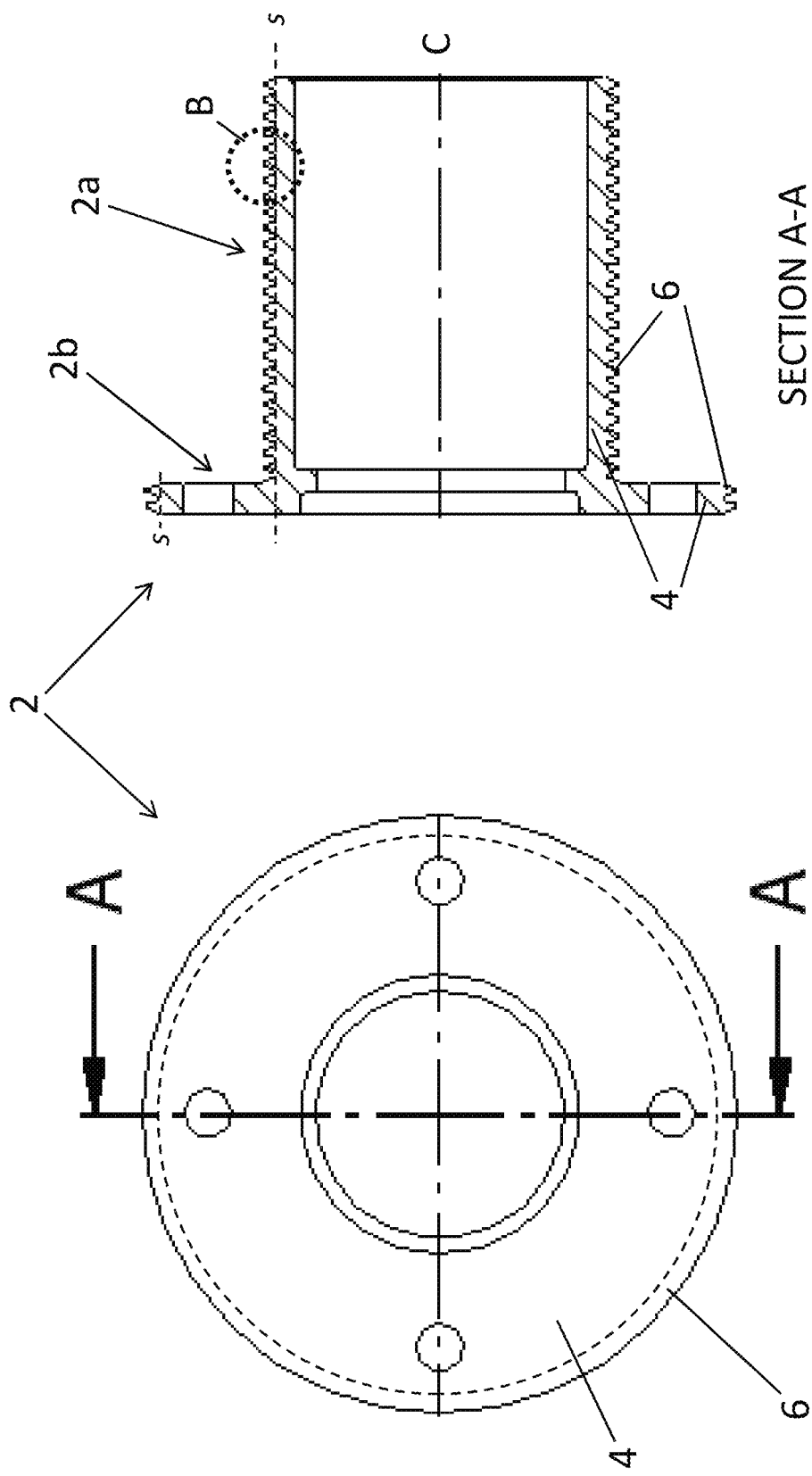

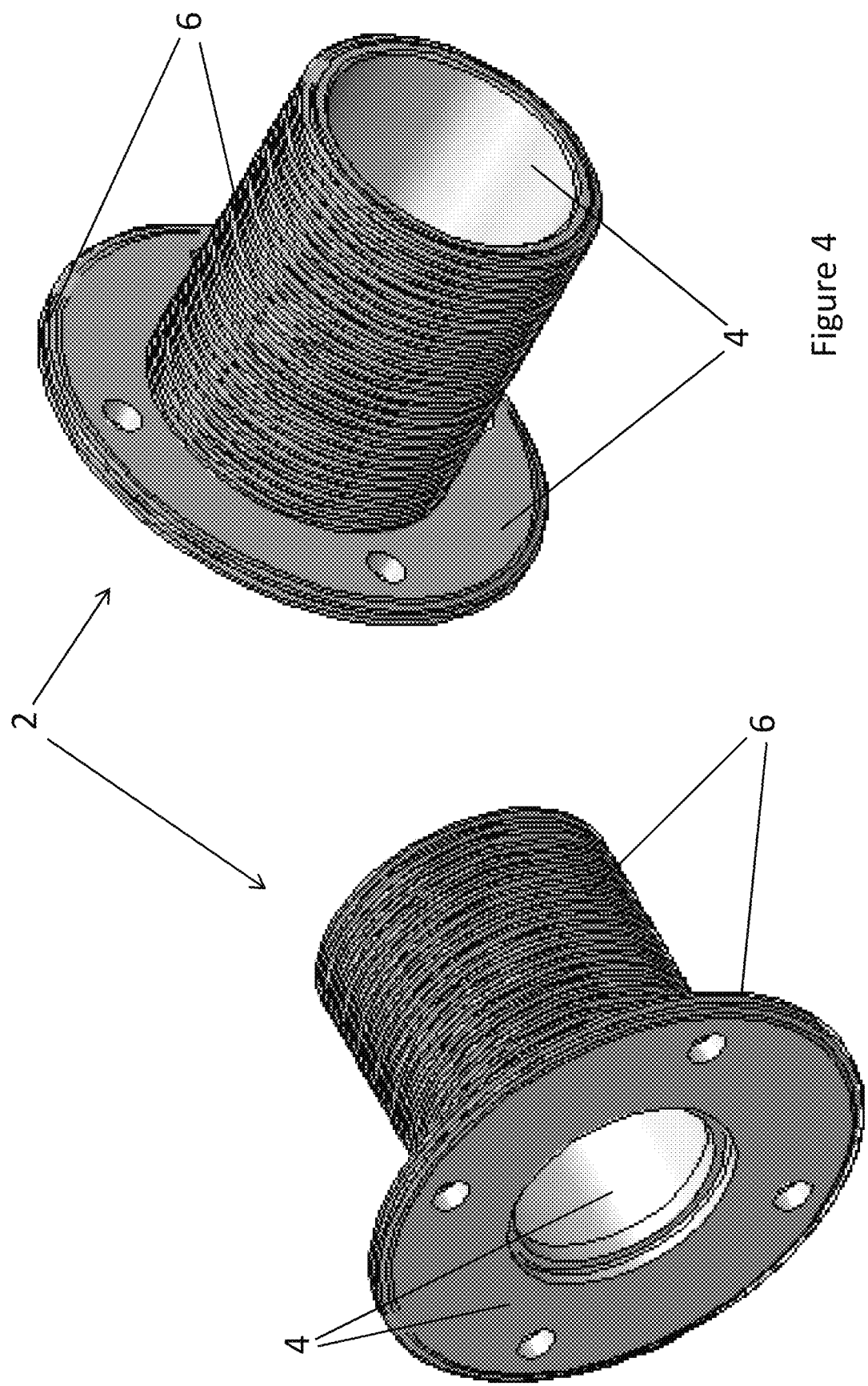

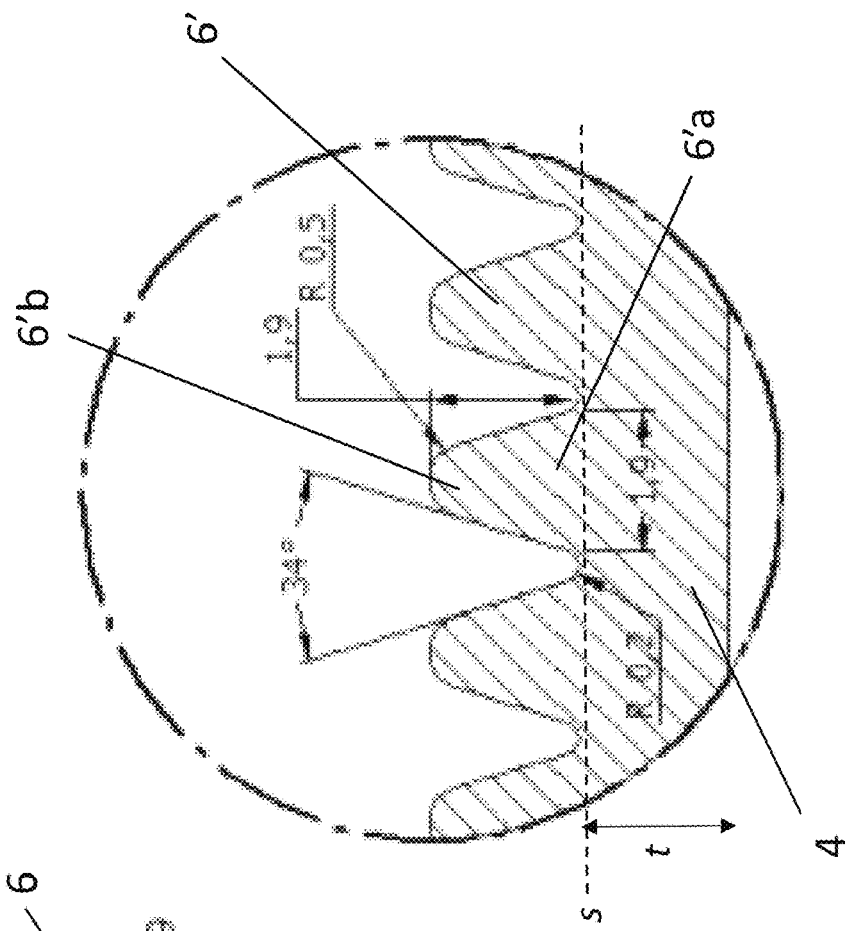
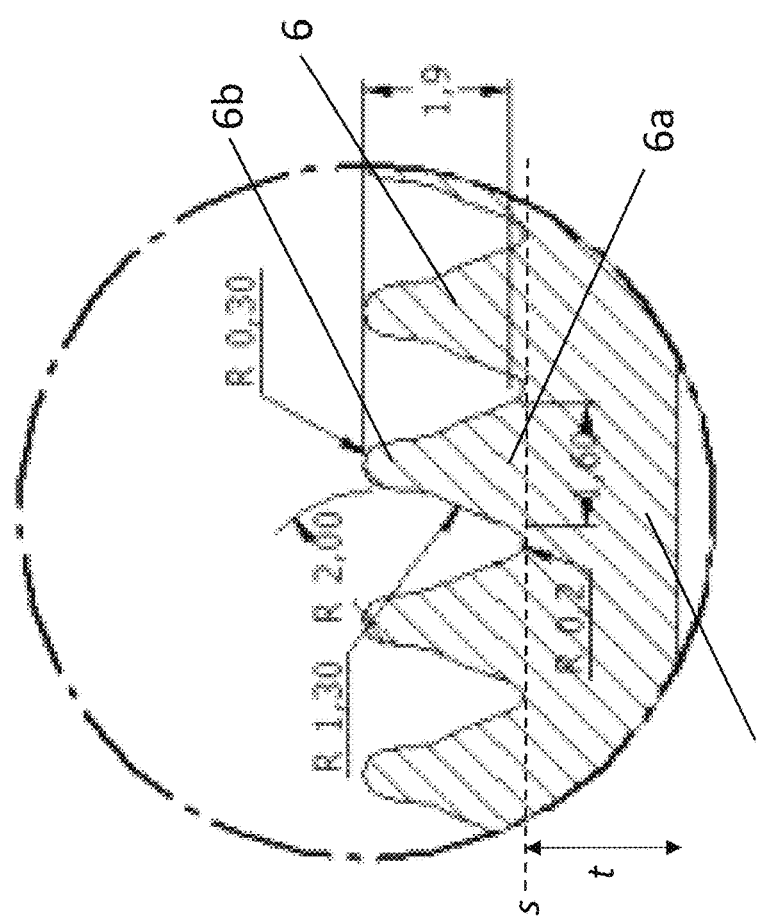
Figure 5a
Figure 5b

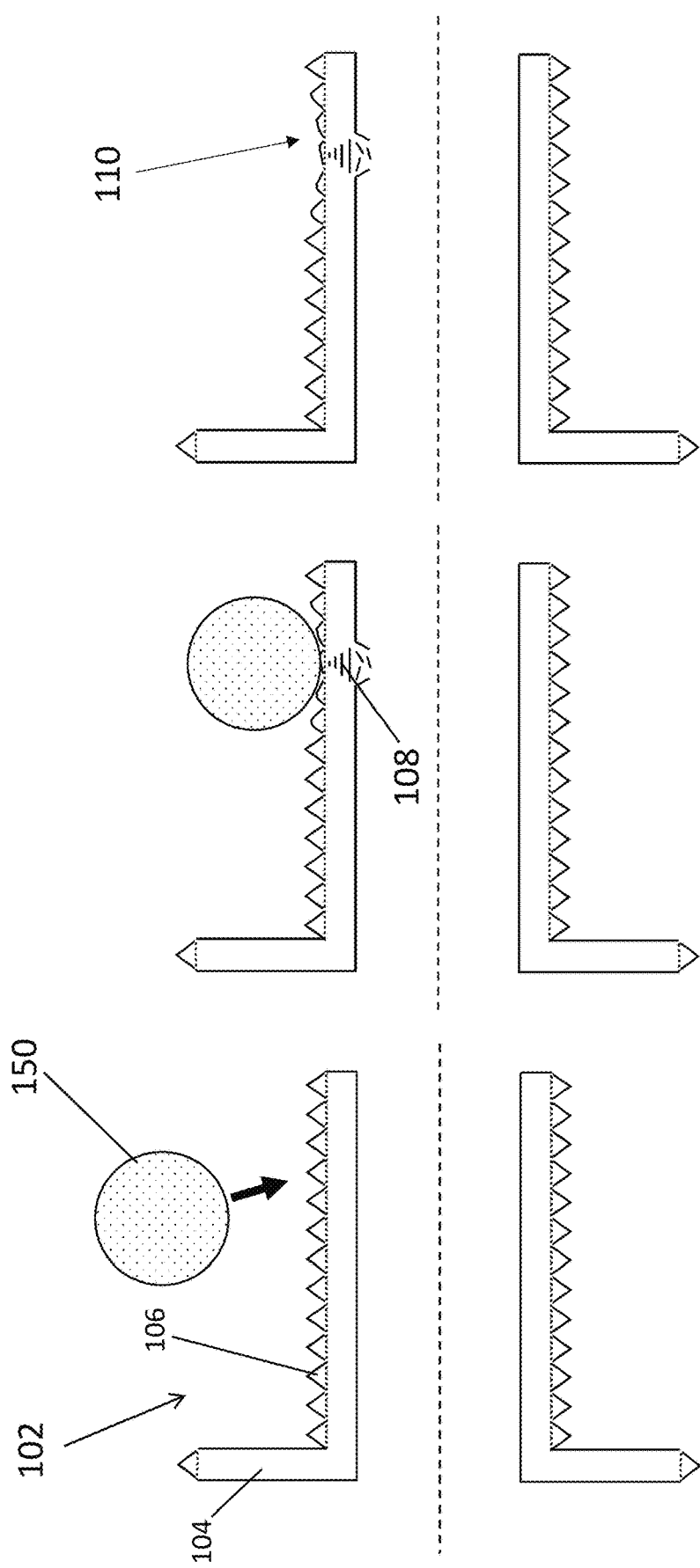

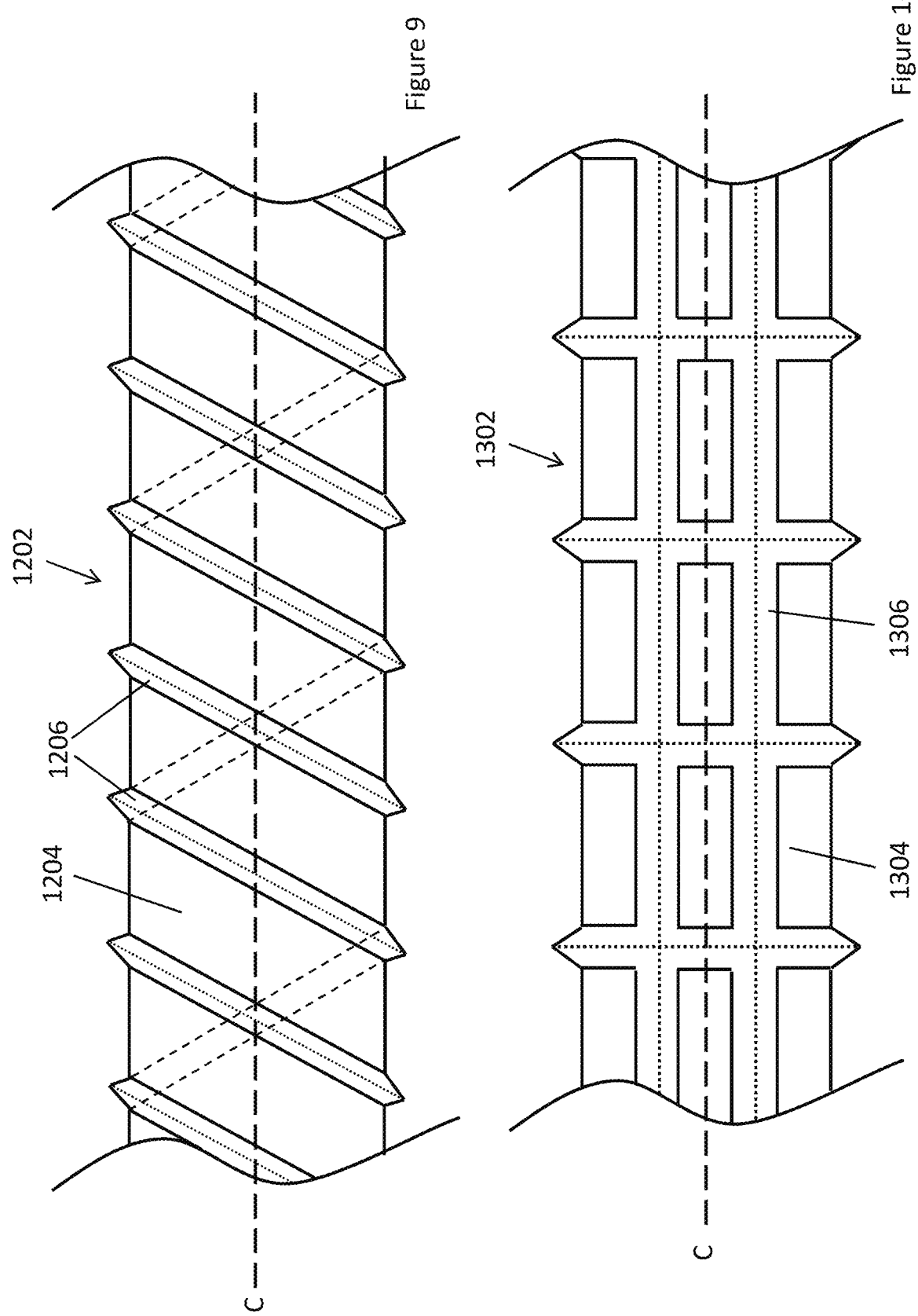

COMPOSITE COMPONENTS WITH IMPACT DETECTION

FOREIGN PRIORITY

This application claims priority to European Patent Application No. 19386041.8 filed Oct. 4, 2019, the entire contents of which is incorporated herein by reference.

TECHNICAL FIELD

The present disclosure relates to composite (e.g. fiber-reinforced polymer) components and in particular to composite components that facilitate the detection of impact damage thereto.

BACKGROUND

Composite materials, such as fiber-reinforced polymers, are used in a wide variety of applications where parts with high strength but low mass are required. For example, carbon or glass fiber-reinforced polymer (FRP) composite materials are often used to produce structural components (e.g. struts, connectors), force-transmitting components (e.g. drive shafts, push rods) and fluid transfer conduits (e.g. fuel pipes) in the aerospace and automotive industries. Components suitable for these applications must have high strength to handle the large forces involved, but also need to minimise weight for fuel saving and/or performance reasons.

The material properties of fiber-reinforced polymers mean that damage (such as delamination or broken fibers) caused by relatively low-energy impacts (e.g. a technician dropping a tool onto a part) is often confined to or focused within the internal regions and/or a reverse side (i.e. opposite to the impact) of the composite material. It can therefore be very difficult to visually detect such damage from the front side of the material. Damage which is detectable by a detailed visual inspection is often referred to as Barely Visible Impact Damage (BVID). Impacts to a composite component with an energy sufficient to cause BVID are therefore the lowest energy impacts that may be detected. However, impacts which do not cause BVID (i.e. impacts of lower energy) can still severely weaken a composite material. With no outwardly visible indication of this weakening on its exterior, these impacts can lead to unexpected failures in components well below the rated performance of a material.

In some cases, BVID can be detected by visually inspecting a reverse side or internal surfaces of composite materials, e.g. the inside surfaces of a composite tube. However, this can be time-consuming and is not always conclusive. In addition, the geometry of some components (e.g. complex pipe geometries) can prevent direct visual inspection of a reverse side or internal surface without inconvenient and time consuming disassembly or the use of specialist tools (e.g. inspection scopes).

As such, composite parts are typically constructed to withstand any impact with an energy below that at which BVID occurs (i.e. to ensure that impacts which cannot be detected do not detract from the performance of the part). In fact, BVID identification and the associated reduction in structural performance at these levels of damage is often the primary factor driving the design of composite materials and components. This can, however, lead to composite components being strengthened or reinforced beyond that required for their primary function (e.g. a fuel pipe featuring thicker walls than would be required to withstand the pressure of the fuel). This increases the weight and material cost of components.

It is important to be able to detect any damage sustained by a composite part, to protect against unexpected failures or reduced performance. However, it is also desirable to minimise the weight and material cost of composite parts. As such, means of reducing the energy level at which BVID is established for a composite component and improved methods of effectively and reliably detecting BVID are sought.

SUMMARY

From a first aspect of the present disclosure there is provided a fiber-reinforced polymer composite component formed from a polymer matrix material containing fiber reinforcement, the component comprising:
  a main portion and at least one raised feature extending from a surface plane of said main portion;
  wherein the at least one raised feature is arranged to incur visually perceptible damage when the component is subject to an impact with an energy above a predetermined impact energy threshold and to resist an impact with an energy below the predetermined impact energy threshold.

It will be appreciated that both the main portion and the at least one raised feature are both made of substantially the same material, that is, the polymer matrix material containing fiber reinforcement. Although the amount of fiber reinforcement present in the at least one raised feature may be different to that present in the main portion, as is disclosed further below, there is fiber reinforcement present throughout the composite component.

In at least some examples, the fiber-reinforced polymer (FRP) composite component is a monolithic component. For example, the composite component may be formed in a single moulding process.

It will be understood that a monolithic fiber-reinforced polymer component comprises a polymer matrix that is continuous throughout the main portion and the at least one raised feature, with the same fiber reinforcement distributed throughout the polymer matrix. However, as will become clear from the discussion below, the distribution of fiber reinforcement may vary between the main portion and the at least one raised feature.

Because the FRP composite component is monolithic (i.e. does not comprise separate elements or parts joined or bonded together) and is formed in a single moulding process, the raised feature(s) are able to detect impacts as soon as the component is produced, without the component having to undergo any further manufacturing steps (such as a detection layer being adhered thereto). This means that the main portion never exists without the impact-detecting raised feature(s) and an inspector can be confident that a part without visually perceptible damage to the raised feature(s) has never incurred an impact with an energy above the predetermined impact energy threshold.

The at least one raised feature thus provides a clear visual aid as to when a component has experienced an impact with an energy above the predetermined impact energy threshold, even if such damage is not visually perceptible in the main portion. For example, an impact with an energy above the predetermined impact energy threshold may cause damage to the main portion that is not easy to spot but creates visually perceptible damage to the at least one raised feature. The visually perceptible damage may be visible through inspection from the outside of the component (e.g. by a human inspector or by a detection device such as an automated inspection camera). What is meant by visually perceptible damage is that the damage can be distinguished by an unaided human eye, such that the damage is easily spotted during handling of the component. Additionally or alternatively, the damage may be visually perceptible to a detection device (e.g. an inspection camera) with a predefined sensitivity (e.g. a predefined imaging resolution).

Various factors may be taken into account when selecting the predetermined impact energy threshold, such as likely impact exposures and associated probability. The main portion of the component is preferably the part of the component that enables the component's function. For example, the component may comprise a fuel pipe and the main portion may be the part of the component that carries fuel. In another example, the component may comprise a strut, and the main portion may be the part of the component that transmits compressive and/or tensile loads.

In one or more examples, therefore, the predetermined impact energy threshold is selected based on one or more properties (e.g. mechanical or structural properties) of the main portion. Mechanical properties may include, for example, strength, stiffness, toughness, flexural modulus, elastic modulus, etc. The one or more properties may be actual or expected properties.

In such examples, an impact that would cause significant damage to the main portion (i.e. damage that may threaten the proper function of the component) appears in the raised feature as visually perceptible damage, while impacts that do not threaten the function of the component do not show up.

For example, the main portion may be designed to have a certain level of mechanical load resistance, such as a maximum internal pressure (e.g. for a fuel pipe) or a maximum compressive or tensile load (e.g. for a strut). In some such examples, the predetermined impact energy threshold may be selected as an energy with which (or above which) impacts to the main potion may (or are likely to) compromise the mechanical load resistance of the main portion. Thus, in such examples, the predetermined impact energy threshold may be selected based on the mechanical load resistance of the main portion.

It will be appreciated that, in one or more examples, the predetermined impact energy threshold may be selected based on the expected use of the component, e.g. because significant damage in one application may not be significant in another application (e.g. load requirements may be different in different applications).

In some examples, the predetermined impact energy threshold is between 0.5 J and 4 J. This means that the at least one raised feature is sensitive to any impact with an energy above 0.5 J and typically incurs visually perceptible damage whenever there is a risk of damage to the composite component. This may be particularly suitable for applications requiring high strength e.g. when the composite component is a pipe for conveying fluids at high pressures.

The at least one raised feature preferably reduces the energy level at which BVID is established, compared to the main portion alone. In some examples, therefore, the predetermined impact energy threshold may be selected to be an impact energy below that at which the main portion would incur visually perceptible impact damage. In at least some examples, in addition or alternatively, the predetermined impact energy threshold may be selected to be less than an impact energy which would cause damage to the main portion. In order to avoid taking components out of service unnecessarily, the predetermined impact energy threshold may be selected to be close to such an impact energy.

In some examples, the predetermined impact energy threshold is between 2 J and 10 J, for example about 4 J. This means that the at least one raised feature is sensitive to any impact with an energy above 2 J, which energy level is close to the energy level of 3-5 J (or more) that would cause damage to the main portion.

The raised feature may be arranged to provide such a clear visual indication of damage that a formal inspection (typically required to detect BVID levels of damage) is not required to detect the occurrence of an impact (i.e. the damage sustained is more visible than BVID levels of damage). Damage may instead be spotted during normal handling or maintenance of the component, reducing the time and resources required to maintain confidence in the integrity of the component. This enables impact damage to be detected earlier (i.e. between periodic inspections), reducing the time a potentially compromised component is used for.

Being able to quickly and reliably detect impact damage can lead to significant time and resource savings, as well as increasing the safety and reliability of composite parts, as a damaged component can be immediately identified for repair or replacement before further use.

The predetermined impact energy threshold may be measured using standard test methods, for example ASTM D7136/D7136M-15 "Standard Test Method for Measuring the Damage Resistance of a Fiber-Reinforced Polymer Matrix Composite to a Drop-Weight Impact Event". This test method determines the damage resistance of multidirectional polymer matrix composite laminated plates subjected to a drop-weight impact event. One or more of the impactor shape, impact energy, and support conditions for the sample under test, may be selected to represent expected impact threats that a given component might suffer in service.

In one or more examples, the visually perceptible damage incurred by the at least one raised feature may comprise a minor abnormality of the raised portion, such as a dent or a chip. In one or more examples, the visually perceptible damage incurred by the at least one raised feature may comprise a noticeable indentation, notch, fracture or crack. In one or more examples, the visually perceptible damage incurred by the at least one raised feature may comprise an entire missing section of the at least one raised portion or indeed a complete absence of the at least one raised portion. Minor blemishes to the at least one raised feature, such as scratches, scuffs or abrasions, may not constitute visually perceptible damage. In at least some examples, the visually perceptible damage may comprise a visible crack (e.g. a crack having a length of at least 10 mm) or a visible dent (e.g. a dent having a depth of at least 0.3 mm or 0.5 mm). Preferably, visually perceptible damage is detectable by a human inspector without the use of tools (e.g. magnifying glass or microscopy). A raised feature is understood to resist an impact when there is no such visually perceptible damage.

As well as providing a visual indicator of impact damage, the at least one raised feature may additionally provide the component with an increased level of impact resistance. For example, the at least one raised feature may absorb some impact energy so as to reduce the damage imparted to the main portion. This may mitigate complete failure of a component after an impact has occurred, but before an inspection has been made to determine that the component needs to be repaired or replaced.

There may be more than one way in which the at least one raised feature can be arranged to incur visually perceptible damage for impacts with an energy above the predetermined impact energy threshold. For example, the way in which the composite component is manufactured (e.g. by injection moulding) and/or the choice of fiber reinforcement (e.g. chopped fiber reinforcement) may at least partially control the impact energy to which it is resistant. Such approaches are disclosed in the applicant's co-pending patent application.

According to various examples of the present disclosure, the inventors have recognised that the geometry, e.g. shape and/or size, of the at least one raised feature may be adjusted to at least partially control the impact energy to which it is resistant. This means that one or more geometrical parameters of the at least one raised feature can be selected to determine the predetermined impact energy threshold above which the raised feature incurs visually perceptible damage. Some of these geometrical parameters are discussed in more detail below.

One or more geometrical parameters may be chosen by taking into consideration the thickness of the underlying main portion.

In at least some examples, the main portion has a thickness below the surface plane, and the at least one raised feature has a height above the surface plane, the thickness and the height being measured from a cross-section taken through the surface plane. In at least some examples, the height is at least the same as the thickness or greater than the thickness. The height may be selected to be large enough to ensure that BVID does not propagate into the main portion, whilst small enough to avoid excessive additional weight and cost. In at least some examples, in addition or alternatively, the height is up to twice the thickness.

In at least some examples, the height is at least 1 mm, 2 mm or 3 mm. In at least some examples, in addition or alternatively, the height is up to 7 mm, 6 mm or 5 mm. In at least some examples, the height is in the range of 1-7 mm. This height range may be particularly well-suited in those examples wherein the thickness of the main portion (such as the wall thickness of a composite pipe) is in the range of 0.5-5 mm.

In at least some examples, the at least one raised feature has a base width at the surface plane, the base width being measured from a cross-section taken through the surface plane. In at least some examples, the base width is at least half the thickness. In at least some examples, the width may be about the same as the thickness or greater than the thickness. The base width may be selected to be large enough to ensure that BVID does not propagate into the main portion, whilst small enough to avoid excessive additional weight and cost. In at least some examples, in addition or alternatively, the base width is up to twice the thickness.

In at least some examples, the base width is at least 0.5 mm, 1 mm, or 2 mm. In at least some examples, in addition or alternatively, the base width is up to 7 mm, 6 mm or 5 mm. In at least some examples, the base width is in the range of 0.5-7.0 mm. This base width range may be particularly well-suited in those examples wherein the thickness of the main portion (such as the wall thickness of a composite pipe) is in the range of 0.5-5 mm.

It will be appreciated that it may not be possible to select the height and base width of the at least one raised feature independently of one another. In at least some examples, the predetermined impact energy threshold is set by the at least one raised feature having a predetermined shape. In other words, the at least one raised feature may be strategically shaped to incur visually perceptible damage when the component is subject to an impact with an energy above a predetermined impact energy threshold and to resist an impact with an energy below the predetermined impact energy threshold. The predetermined shape may be characterised by one or more parameters, including, for example, height, base width, aspect ratio, angle, and radius of curvature. These parameters are discussed further below.

The inventors have recognised that the predetermined shape of the at least one raised feature can be adjusted to control the impact energy to which it is resistant (and potentially also the type of damage incurred for a given impact energy). This means that the predetermined shape of the at least one raised feature can be selected to determine the impact energy above which the raised feature incurs visually perceptible damage.

In at least some examples, the at least one raised feature has a cross-sectional profile defined in a cross-section taken through the surface plane. The cross-sectional profile may have a curved or curvilinear shape. Examples of some cross-sectional profiles which may be used include triangular, rectangular, polygonal, curved, semi-circular, bell-shaped, etc. In at least some examples, the cross-sectional profile is generally triangular.

In at least some examples, the cross-sectional profile has an aspect ratio defined by height/width, wherein the width is measured at a base of the cross-sectional profile adjacent the surface plane. The aspect ratio might be as low as 0.5 (e.g. for raised features that are wide at the base), but in at least some examples the aspect ratio is at least one. In at least some examples, the aspect ratio is greater than one. The at least one raised feature may therefore have a cross-sectional profile that is generally higher than wide. For example, the aspect ratio defined by height/width may be >1, >2, >3, or up to about 4.

In at least some examples, the cross-sectional profile has an angle measured from the surface plane. The angle may vary along the cross-sectional profile. In at least some examples, the angle is at least 30°, or at least 40°, or at least 45°. In at least some examples, in addition or alternatively, the angle is up to 60°, or up to 70°, or up to 75°.

The inventors have recognised that some geometrical parameters may be more important than others for setting the predetermined impact energy threshold. In particular, the inventors have found that when a raised feature converges in its cross-sectional profile towards a tip or apex, the shape of the tip may be dominant in determining the visual level of damage caused by a given impact, regardless of the overall aspect ratio of the cross-sectional profile.

In at least some examples, the cross-sectional profile extends away from a base adjacent the surface plane in a converging shape having a tip that defines a maximum height above the surface plane. The cross-sectional profile may extend in any suitable way, curved or curvilinear, between the base and the tip. Although the cross-sectional profile may take any number of shapes, in at least some examples the cross-sectional profile has a first width at the base and a second, smaller width at the tip.

In at least some examples, the cross-sectional profile includes a curved tip. A curved tip may be chosen over a sharp tip so as to ensure that the tip is not overly fragile and prone to damage even in the absence of an impact with an energy above the predetermined impact energy threshold.

In at least some examples, the tip has a radius of curvature that is less than a base width of the at least one raised feature at the surface plane (which may be the first width for converging shapes as disclosed above).

In at least some examples, the tip has a radius of curvature that is 3 mm or less, for example 2 mm or less, or for example 1 mm or less. In at least some examples, the tip has a radius of curvature that is at least 0.1 mm, for example at least 0.3 mm, or for example at least 0.5 mm. In at least some examples, the tip has a radius of curvature that is in the range of 0.3 to 3.0 mm.

In any of the disclosed examples, the cross-sectional profile may be symmetric or asymmetric. The at least one raised feature may have a single (i.e. constant) cross-sectional profile. However, in some examples the at least one raised feature may comprise at least two different cross-sectional profiles (i.e. at different places on the component) and/or may comprise a varying cross-sectional profile. For example, the cross-sectional profile may vary or change along a length of the at least one raised feature.

The inventors have recognised that one or more geometrical parameters of the at least one raised feature can be selected to at least partially determine the distribution of the fiber reinforcement between the main portion and the at least one raised feature.

In some examples, the at least one raised feature comprises a cross-sectional profile that is selected to achieve a predetermined volume fraction of fiber in the at least one raised feature that is different to a volume fraction of fiber in the main portion. For example, the main portion may comprise a first volume fraction of fiber reinforcement and the at least one raised feature may comprise a second, different volume fraction of the fiber reinforcement. Preferably the second volume fraction is less than the first volume fraction. The second fiber volume fraction being lower decreases the material strength of the at least one raised feature, thereby reducing the impact energy at which damage occurs.

The at least one raised feature being more ductile or tough than the main portion (i.e. where the second fiber volume fraction is less than the first fiber volume fraction) may be advantageous for one or more reasons. For example, the at least one raised feature may provide an impact absorption effect. For example, a part or the whole of a raised feature of greater toughness is less likely to become detached from the main portion when incurring damage. This reduces the likelihood of fragments of composite (that could break off a brittle raised feature when subject to an impact) interfering with the function of the component (e.g. reducing the chance of composite foreign bodies entering a fuel tank, where the component is a fuel system component such as a fuel pipe).

In reality, the distribution of the fiber reinforcement between the main portion and the at least one raised feature may be controlled by one or both of manufacturing steps and geometrical considerations.

The at least one raised feature may cover only a small fraction of the surface of the main portion by area, e.g. up to 30%, up to 20%, or even 10% or less. For example, the at least one raised feature may comprise a narrow ridge. However, even in examples where the at least one raised feature does not cover a large fraction of the surface of the main portion by area, effective impact detection can still be achieved so long as areas of the surface between the raised feature(s) are sufficiently small.

The inventors have recognised that the at least one raised feature covering only a fraction of the surface of the main portion by area can improve the ability of the at least one raised feature to detect impacts and reduce component cost when compared to providing the at least one raised feature as a complete layer (i.e. with close to 100% coverage). The sensitivity of such a complete layer cannot easily be made as high as that of a distinct raised feature, for example, a ridge (i.e. the predetermined impact energy threshold cannot be made as low). Furthermore, adjusting the sensitivity of a component comprising a complete sacrificial layer might require adjusting the thickness of said layer (as opposed to, for example, adjusting the dimensions or cross-sectional profile of a raised feature as described above). It would be difficult, therefore, to adjust the sensitivity of a component with a required overall thickness (i.e. of the main portion and the at least one raised portion combined) without having also to alter the thickness of the main portion, with the associated impact on design costs and structural performance.

In addition, there are additional manufacturing challenges involved in producing a consistent and uniform layer (i.e. with uniform thickness), increasing the cost of production.

For example, if the component is to be used in an environment where any impact is likely to be caused by relatively large impact objects (e.g. a spanner), the at least one raised feature does not need to cover the entire surface of the main portion without interruption. Instead, the at least one raised feature needs only to be present on the surface to the extent that an impact to the component caused by a given impact object would necessarily or highly likely hit (and thus damage, if the energy were high enough) the raised feature. A type and/or source of impact to which a component is likely to be subject may thus be considered when selecting the predetermined shape of the at least one raised feature and a layout of the at least one raised feature on the surface plane of the main portion.

The at least one raised feature may be part of a pattern of raised features which extends across some, most, or all, of the surface plane of the main portion. In some examples, a pattern of raised features may be arranged to provide uniform coverage over substantially the entire surface plane of the main portion, such that impacts at any location on the surface may be detected.

The at least one raised feature may comprise a plurality of raised features. In some examples, different raised features may extend from different areas of the surface plane of the main portion. In some examples, different raised features may extend from different surface planes of a plurality of surfaces to provide a different impact resistance to different sections of the main portion. However, for consistency and ease of manufacturing, the at least one raised feature may be part of a pattern comprising a plurality of raised features that are the same as one another. For example, each raised feature in the plurality of raised features may have the same cross-sectional profile e.g. predetermined shape.

In at least some examples, the plurality of raised features are arranged across a surface plane of the main portion and are spaced apart by a spacing distance. The spacing distance may be regular or irregular and it may be chosen depending on an impact source as described above. In at least some examples, the plurality of raised features are arranged across a surface plane of the main portion in a periodic pattern having a regular spacing distance between adjacent raised features. In such examples, the spacing distance (also known as the pitch) may be maximised as long as the spacing distance is not so great that an impact could occur in the gaps between raised features without being detected, e.g. taking into consideration the smallest size of tool that may be dropped on the component in service. This can help to reduce manufacturing (e.g. moulding) costs and part weight.

In at least some examples, the spacing distance is more than twice the width in the surface plane of each raised feature. In at least some examples, the spacing distance is at least three times the width in the surface plane of each raised feature. As is disclosed above, the width may be measured from a cross-section taken through the surface plane, and the width may be measured at a base of each raised feature adjacent the surface plane. In at least some examples, the spacing distance is at least 1.5 mm, 2 mm, or 3 mm. In at least some examples, in addition or alternatively, the spacing distance is up to 12 mm, 13 mm, 14 mm or 15 mm. In at least some examples, the spacing distance is in the range of 1.5-15 mm. This range may be particularly well-suited in those examples wherein the thickness of the main portion (such as the thickness of a composite pipe) is in the range of 0.5-5 mm.

In at least some examples, the plurality of raised features are arranged across the surface plane of the main portion and adjacent raised features are connected to one another by a root. For example, the pattern of raised features may comprise a continuous undulation or crenellation superimposed on the surface plane of the main portion. The root may have a radius that is minimised to a practical manufacturing limit e.g. to allow ease of moulding and mould manufacture. As the raised features are not part of the main portion that is the load-bearing part of the composite component, there is not expected to be a risk of notable stress concentration arising from a small root radius. In at least some examples, the root radius is in the range of 0-2 mm.

In at least some examples, a plurality of different raised features (i.e. features sensitive to different impact energy thresholds) may be provided in one area of the surface plane to provide more information about the energies of impacts. In one or more examples, the plurality of raised features comprises at least two different raised features. The at least two different raised features may be different types of raised features, for example one type having a triangular cross-sectional profile and another type having a rounded cross-sectional profile. For example, high sharp peaks (with a low impact energy threshold) may be separated by lower rounded peaks (with a much higher impact energy threshold) to enable impacts to be categorized by energy (i.e. an impact which results in visually perceptible damage to high sharp peaks but not to collocated lower rounded peaks must have an energy falling between the respective thresholds of the two types of peak).

In one or more examples, the surface plane of the main portion is a cylindrical surface plane extending along a central axis (i.e. the axis of rotation). In at least some examples, the at least one raised feature comprises one or more ridges extending from the cylindrical surface plane and running in a helix around the central axis. The angle at which the helix runs may be selected such that a spacing distance between passes of the ridge is smaller than a smallest dimension of a probable impact object. In at least some examples, alternatively or in addition, the at least one raised feature comprises a plurality of ridges on the cylindrical surface that run circumferentially around the central axis. These circumferential ridges may be axially spaced with a spacing distance as disclosed above, e.g. the spacing distance being smaller than a smallest dimension of a probable impact object. In at least some examples, alternatively or in addition, the at least one raised feature comprises a plurality of ridges on the cylindrical surface that run along the central axis. These axial ridges may be circumferentially spaced with a spacing distance as disclosed above, e.g. the spacing distance being smaller than a smallest dimension of a probable impact object. Of course a combination of one or more types of ridge (helical, circumferential and/or axial) may be provided in any given pattern of raised features.

In at least some examples of the present disclosure, the component comprises a tubular main portion having a central axis and the at least one raised feature extending from an outer surface plane of the main portion and running in a helical and/or circumferential and/or axial direction relative to the central axis. The component may be a generally tubular component such as a fluid transfer conduit e.g. a fuel pipe.

In at least some examples of the present disclosure, the component comprises a tubular main portion having a wall thickness of between 0.5 mm and 5 mm. In at least some examples, in addition or alternatively, the component comprises a tubular main portion having a cylindrical shape with a (internal or external) diameter of between 10 mm and 150 mm.

The FRP composite component may be formed from any suitable polymer matrix material, e.g. a thermoset or thermopolymer. The choice of polymer matrix material may be linked to the manufacturing process used to make the composite component.

In some examples, the FRP composite component may be formed from a thermoset matrix material (such as epoxy resin).

In some examples, the polymer matrix material may comprise a thermoplastic polymer matrix, e.g., such as polyphenylene sulfide (PPS), polyether ether ketone (PEEK), polyetherketoneketone (PEKK), polyetherketone (PEK) or another polymer that is part of the polyaryletherketone (PAEK) family. The polymer matrix may comprise other materials, such as a thermoset polymer. In one preferred example, the composite component is formed from a PEEK polymer matrix containing 30% chopped carbon fiber reinforcement.

In some examples, the FRP composite component may be made by any known technique such as resin transfer moulding, vacuum bagging, prepreg moulding, spray layup or filament winding. In moulding processes, the at least one raised feature may be formed by one or more suitably shaped cavities in the mould. In other processes, the at least one raised feature may be formed by post-curing subtractive manufacturing steps such as CNC machining.

In an exemplary method of manufacturing the fiber-reinforced polymer composite component, the method comprises:
  providing a mould comprising a main cavity and at least one additional cavity that extends from the main cavity;
  introducing a polymer matrix material containing fiber reinforcement into the mould to fill the main cavity and the at least one additional cavity to form a fiber-reinforced polymer composite component with a main portion formed in the main cavity and at least one raised feature formed in the additional cavity and extending from a surface plane of said main portion;
  wherein the at least one raised feature is arranged to incur visually perceptible damage when the component is subject to an impact with an energy above a predetermined impact energy threshold and to resist an impact with an energy below the predetermined impact energy threshold.

In some examples, the FRP composite component is made by an injection moulding process. The manufacturing method may comprise injecting a molten thermoplastic polymer matrix containing fiber reinforcement into the mould.

The use of an injection moulding process is beneficial as it can manufacture monolithic fiber-reinforced composite components consistently and quickly with relatively low cost. There is little wasted material (e.g. compared to subtractive manufacturing processes such as CNC machining) and there are few restrictions on the shape of component that can be produced.

The FRP composite component may be formed from a polymer matrix material containing any suitable fiber reinforcement. The fiber reinforcement may comprise one or more of carbon fibers, glass fibers, aramid fibers or any other suitable fiber material. The fiber reinforcement may comprise a mixture of two or more types of fiber.

In at least some examples, the fiber reinforcement is chopped fiber reinforcement. Especially when moulding processes are used to make the composite component, a chopped fiber reinforcement may be more suitable for ensuring that there is fiber reinforcement present in both the main portion and the at least one raised feature.

The chopped fibers of the chopped fiber reinforcement may all have substantially the same length. However, in many cases the chopped fibers have a variety of lengths that may be characterised by an average fiber length (e.g. mean or median) and/or other parameters of a fiber length distribution. In some preferred examples the chopped fiber reinforcement has an average fiber length of between 50 and 500 microns, e.g., 100 microns, 150 microns, 200 microns, 250 microns, 300 microns, 350 microns, 400 microns or 450 microns.

The fraction by volume of an FRP part that consists of fiber reinforcement is customarily referred to as the fiber volume fraction of the part. Normally FRP components are manufactured to have a uniform fiber volume fraction throughout, for consistency and predictability of mechanical performance as well as ease of manufacture. Indeed, in some examples of the present disclosure, the fiber-reinforced polymer composite component comprises a substantially constant fiber volume fraction throughout (i.e. wherein the fiber volume fraction in the main portion is substantially equal to that in the at least one raised portion).

In some other examples of the present disclosure, as already discussed above, the main portion may comprise a first volume fraction of fiber reinforcement and the at least one raised feature may comprise a second, different volume fraction of the fiber reinforcement. Preferably the second volume fraction is less than the first volume fraction. The second fiber volume fraction being lower decreases the material strength of the at least one raised feature, thereby reducing the impact energy at which damage occurs. A difference in volume fraction of the fiber reinforcement between the main portion and the at least one raised feature may be controlled by one or more factors, including the way in which the composite component is manufactured (e.g. by injection moulding) and/or the choice of fiber reinforcement (e.g. chopped fiber reinforcement) and/or adjusting geometrical parameters as discussed above.

In some applications of composite materials, such as glass fiber reinforced polymer pipes within aircraft fuel systems, for example, it is important to control the conductivity of the composite component. Ideally the fuel pipes are insulating enough to avoid becoming the preferred path for lighting conduction, whilst conductive enough to avoid static build-up due to fuel flow. Adding a particular amount of a conductive additive (e.g. carbon black) to the polymer during manufacture allows the desired level of conductivity to be achieved. It is known to tailor the electrical conductivity of composite fuel pipes by mixing a dispersion of electrically conductive particulate filler into a fiber reinforced polymer material, for example as disclosed in WO 2009/087372, the contents of which are hereby incorporated by reference. The conductive additive is ideally present throughout the component (i.e. in both the main portion and the at least one raised feature).

In at least some examples of the present disclosure, the composite component is a fluid transfer conduit such as a fuel pipe.

In some examples, the at least one raised feature comprises an outer coating with a colour which is contrasting with a colour of the FRP polymer (e.g. the FRP polymer may be black due to the addition of a carbon black additive, while the coating is white). This may enable any damage to the at least one raised feature to be more readily identified, as underlying composite material exposed due to damage incurred by the at least one raised feature would contrast with the intact coating surrounding the damaged area.

Features of any example described herein may, wherever appropriate, be applied to any other example described herein. Where reference is made to different examples or sets of examples, it should be understood that these are not necessarily distinct but may overlap.

DETAILED DESCRIPTION

One or more non-limiting examples will now be described, by way of example only, and with reference to the accompanying figures, in which:

FIG. 1 is a cross-section of a monolithic fiber-reinforced polymer composite component according to an example of the present disclosure;

FIG. 2 is a cross-section of the monolithic fiber-reinforced polymer composite component along the plane A-A shown in FIG. 1;

FIG. 3 is a perspective view of the monolithic fiber-reinforced polymer composite component;

FIG. 4 is another perspective view of the monolithic fiber-reinforced polymer composite component;

Figure 11:
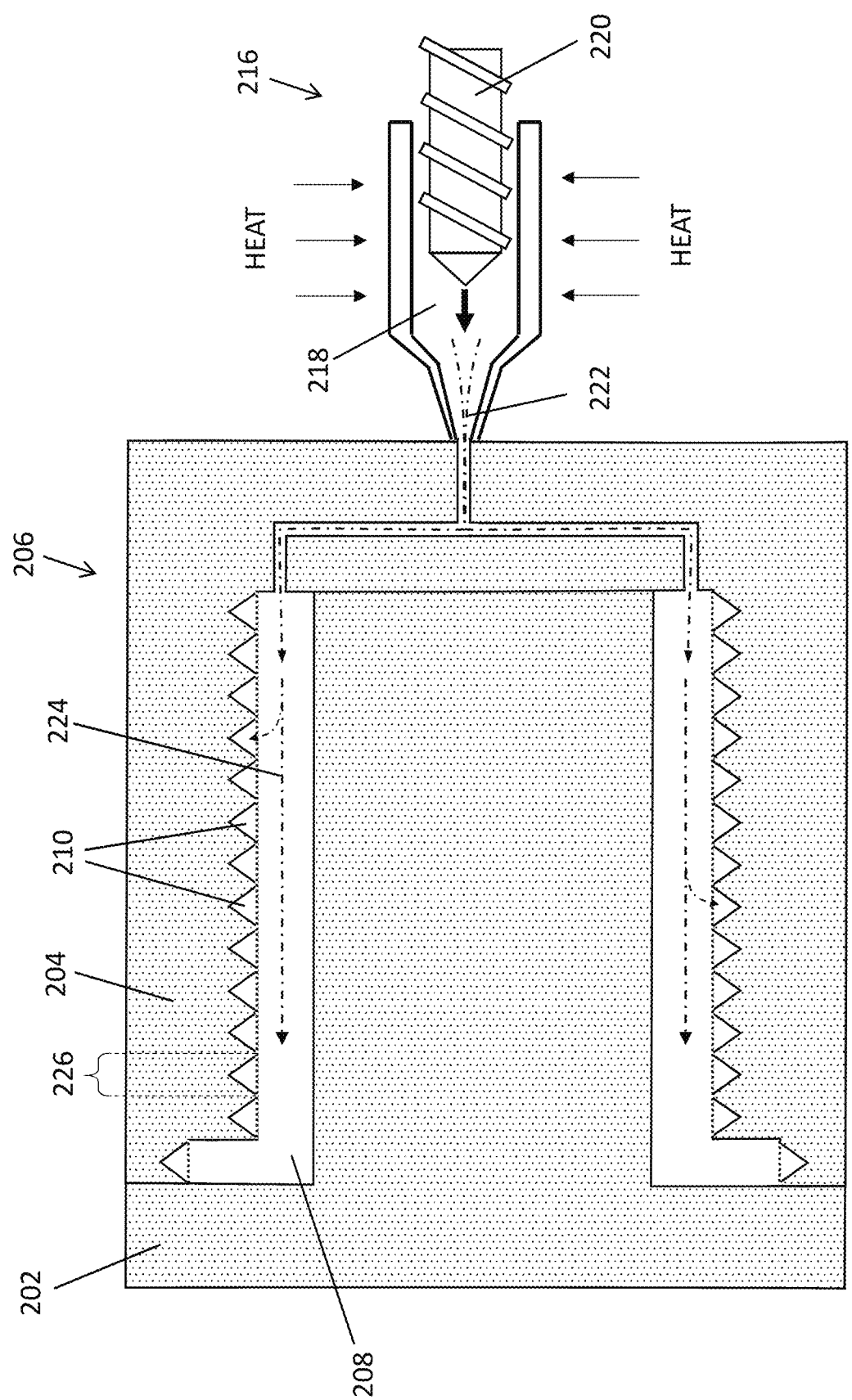
Figure 12:
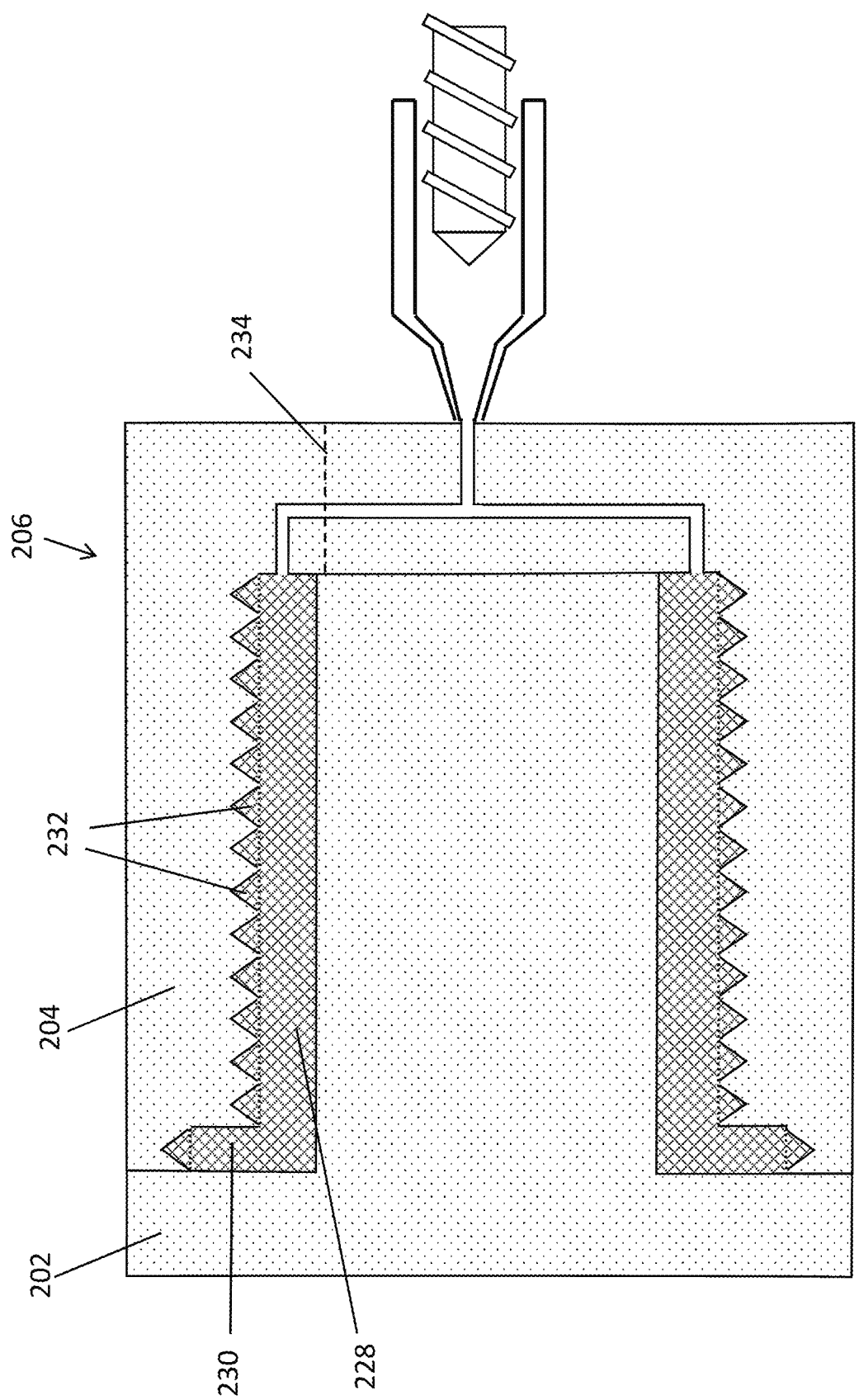
Figure 13:
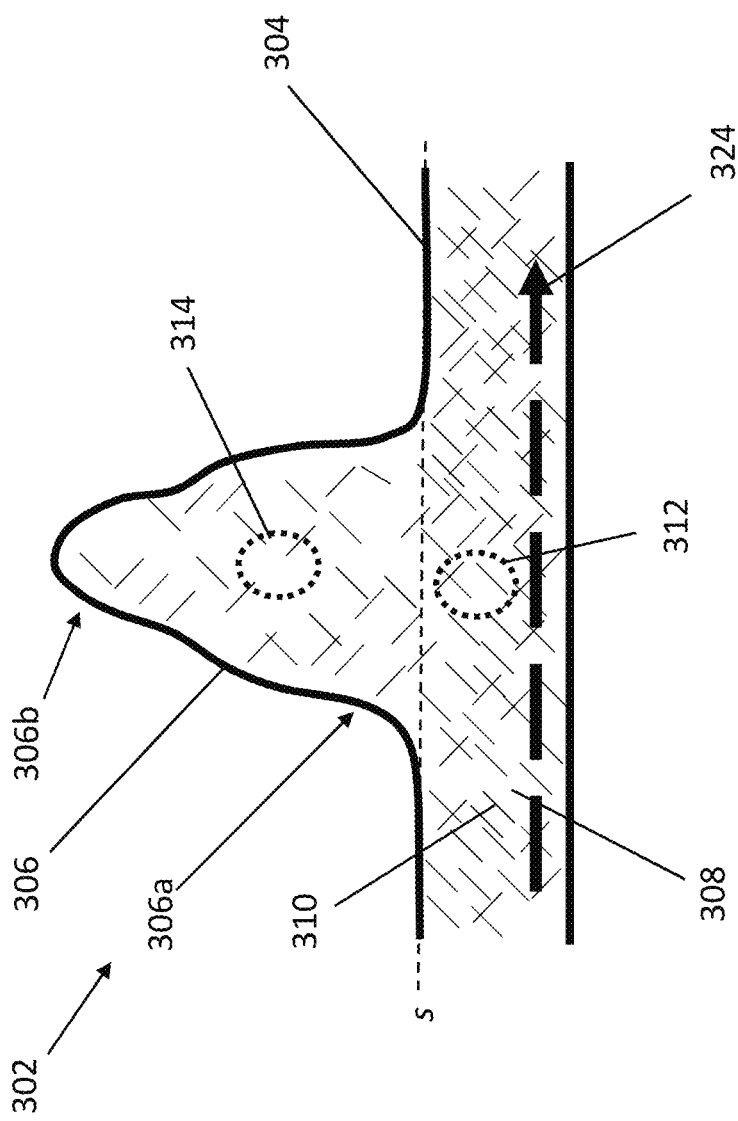

FIGS. 5*a* and 5*b* are enlarged views of the area B shown in FIG. 2 according to first and second examples;

FIGS. 6-8 show the effect of an impact on a monolithic fiber-reinforced polymer composite component according to an example of the present disclosure;

FIG. 9 shows a fiber-reinforced polymer composite pipe according to an example of the present disclosure;

FIG. 10 shows a fiber-reinforced polymer composite pipe according to another example of the present disclosure;

FIGS. 11 and 12 schematically illustrate an injection moulding process for manufacturing a monolithic fiber reinforced polymer composite component according to an example of the present disclosure; and FIG. 13 is a schematic cross-sectional view of a single raised feature of a monolithic fiber-reinforced polymer composite component according to an example of the present disclosure.

DETAILED DESCRIPTION

FIGS. 1-5 show different views of a monolithic fiber-reinforced polymer (e.g. carbon fiber-reinforced polymer, CFRP) composite component 2. In this example, the component 2 comprises a flanged cylindrical connector that extends along a central axis C and comprises a tube section 2*a* and a flange section 2*b*. The component 2 comprises a thermoplastic polymer reinforced with chopped fiber reinforcement (the fibers are not shown in FIGS. 1-5). The average (median) length of the chopped fiber reinforcement may be between 50 and 500 microns (e.g. 200 microns).

The component 2 comprises a main portion 4 and a plurality of raised features 6 that extend from a surface plane s of the main portion 4. In this example, the plurality of raised features 6 comprises a plurality of ribs with a substantially triangular cross-sectional profile (in the section A-A shown in FIG. 2). The raised features 6 extend radially away from the surface plane s (relative to the central axis C) and run circumferentially around the tube section 2a and the flange section 2b of the component 2, as seen in FIGS. 3 and 4. The raised features 6 are arranged over the whole length of the component 2.

The raised features 6 serve to detect potentially damaging impacts to the component 2. As explained in more detail below, with reference to FIGS. 6-8, when the component 2 is subject to an impact with an impact energy above the predetermined impact energy threshold, at least some of the raised features 6 incur visually perceptible damage even when the main portion 4 may not, allowing an human inspecting the part to recognise quickly and easily that the part has been subject to an impact.

By appropriate design of the raised features 6, the threshold energy above which the raised features 6 are sensitive (i.e. when visually perceptible damage is incurred) may be selected to be an energy at which impacts would cause severe damage (i.e. damage that impacts the pipe's performance) to the main portion 4. Impacts below this energy do not cause visible damage to the raised features 6 but also do not cause substantial damage to the main portion 4. As such, the exterior of the component 2 can quickly reveal evidence of severe damage-causing impacts while insignificant impacts (which do not affect the component's ability to function as intended) are not recorded. The presence and magnitude of impact damage to the component 2 can therefore be assessed quickly without requiring an in-depth investigation. Visually perceptible damage to the raised features 6 may, for example, comprise a portion (or the entirety) of the raised feature 6 breaking off. It may alternatively comprise a dent or other deformation.

FIG. 5a shows a close-up cross-sectional view of the raised features 6 in the area B indicated in FIG. 2 according to a first example. In this example, each raised feature 6 comprises a generally triangular cross-sectional profile (although other profile shapes are possible) extending from a base 6a adjacent the surface plane s of the main portion 4 to a narrower tip 6b, with a height above the surface plane s (i.e. in a radial direction relative to the central axis C) of 1.9 mm. The base 6a has a maximum width (in a direction parallel to the central axis C) of 1.60 mm (i.e. less than ten times the average chopped fiber length, which in this example is 200 microns). The cross-sectional profile extends away from the base 6a in a converging shape that narrows to a width of 1.30 mm before extending further to the tip 6b. The tip 6b has a substantially constant width of 0.60 mm and terminates with a curve of radius 0.30 mm. The raised features 6 are arranged across the surface plane s of the main portion 4 and adjacent raised features 6 are connected to one another by a root having a radius of 0.2 mm.

FIG. 5b shows a close-up cross-sectional view of the raised features 6' in the area B indicated in FIG. 2 according to a second example. In this example, each raised feature 6' again comprises a generally triangular cross-sectional profile extending from a base 6'a adjacent the surface plane s of the main portion 4 to a narrower tip 6'b, with a height above the surface plane s (i.e. in a radial direction relative to the central axis C) of 1.9 mm. The base 6'a has a maximum width (in a direction parallel to the central axis C) of 1.9 mm (i.e. wider than in the first example but still less than ten times the average chopped fiber length, which in this example is 200 microns). The tip 6'b has a radius of curvature of 0.5 mm. The raised features 6' being less pointed than those seen in FIG. 5a means that they are less fragile and may be selected to set a higher value for the predetermined impact energy threshold.

As seen in FIG. 5b, the raised features 6' are arranged across the surface plane s of the main portion 4 and adjacent raised features 6' are connected to one another by a root having a radius of 0.2 mm. The pitch (or spacing distance) between adjacent raised features 6' may be in the range of 1.5-15 mm.

Also seen in FIG. 5b, the raised features 6' have a cross-sectional profile defining an angle measured from the surface plane s, in this example being about 60°.

In the examples of FIGS. 1-5, the plurality of raised features 6, 6' is arranged across the surface plane s of the main portion 4 in a periodic pattern having a regular spacing distance between adjacent raised features 6, 6'.

In the examples of FIGS. 1-5, the main portion 4 in the tube section 2a of the connector 2 is tubular and has a wall thickness tin the range of 0.5-5 mm.

FIGS. 6-8 illustrate the effect of an impact with an energy above the predetermined impact energy threshold on a fiber-reinforced polymer composite component 102. The component 102 comprises a main portion 104 and a plurality of raised features 106. The plurality of raised features 106 are arranged (e.g. by virtue of their shape, size, orientation and/or fiber volume fraction) to incur visually perceptible damage when the component 102 is subject to an impact with an energy above a predetermined impact energy threshold and to resist an impact with an energy below the predetermined impact energy threshold. The predetermined impact energy threshold is selected to correspond with an impact energy that is likely to reduce the mechanical load capability of the main portion 104.

FIG. 6 shows the component 102 immediately preceding the impact on the component 102 by an impactor 150 (e.g. a dropped maintenance tool). The impact has an energy that is above the predetermined impact energy threshold. FIG. 7 shows the moment of impact and FIG. 8 shows the aftermath of the impact.

It can be seen in FIGS. 7 and 8 that the impact causes the main portion 104 to incur significant internal damage 108 which is likely to negatively affect the mechanical capabilities of the component 102 but may not easily be identified by an external inspection of the component 102 as most of the damage 108 is to an internal wall of the component 102. However, because the impact is above the threshold energy, it causes the raised features 106 to incur visibly perceptible damage 110 which is easily identifiable by an external inspection e.g. by an unaided human eye. In this case, a number of the raised features 106 have been dented, chipped, snapped or otherwise deformed in a manner that is readily visible.

The raised features 106 thus provide a means of easily detecting and assessing the internal damage 108 to the component 102.

FIG. 9 shows a side view of a fiber-reinforced polymer composite pipe 1202 according to an example of the present disclosure. The pipe 1202 comprises a main portion 1204 which extends along a central axis C and two raised features 1206, which extend from an outer surface of the pipe 1202 and continue in a helix along the outer surface of the pipe 1202 around the central axis C. Dashed lines are used to indicate the path of one of the raised features 1206 on the reverse side of the pipe 1202.

The pipe 1202 is constructed from fiber-reinforced polymer (e.g. carbon fiber-reinforced polymer, CFRP) composite. This provides the main portion 1204 with high strength and resilience, but also means that an impact to the outer surface may cause significant damage to the internal layers of main portion 1204 without leaving a visually perceptible indication on the outer surface of the main portion 1204.

The raised features 1206, however, are arranged to incur visually perceptible damage when the composite component is subject to an impact with an energy above a predetermined impact energy threshold and to resist an impact with an energy below the predetermined impact energy threshold (e.g. due to having a particular geometry and/or fiber volume fraction). As a result, when the pipe 1202 is subject to an impact above a threshold impact energy, the raised features 1206 incur visually perceptible damage even when the main portion 1204 may not. By appropriate design of the raised features 1206, the threshold energy above which the raised features 1206 are "sensitive" (i.e. when visually perceptible damage is incurred) is selected to be an energy at which impacts would cause severe damage (i.e. damage that impacts the pipe's performance) to the main portion 1204. Impacts below this energy do not cause visible damage to the raised features 1206 but also do not cause substantial damage to the main portion 1204. As such, the exterior of the pipe 1202 (whatever its internal geometry) can quickly reveal evidence of severe damage-causing impacts while insignificant impacts are not recorded. The presence and magnitude of impact damage to the pipe 1202 can therefore be assessed quickly without requiring an in-depth investigation. Visually perceptible damage to the raised features 1206 may, for example, comprise a portion (or the entirety) of the raised feature 1206 breaking off. It may alternatively comprise a dent or other significant deformation.

The shape and/or layout of the raised features 1206 are carefully selected to give them the required sensitivity. The cross-sectional profile of the features 1206 may be selected to give the features 1206 a certain level of impact resistance. The raised features 1206 of FIG. 9 have a triangular cross-sectional profile.

FIG. 10 shows a side view of a fiber-reinforced polymer composite pipe 1302 according to another example of the present disclosure. The pipe 1302 comprises a main portion 1304 that extends along a central axis C and raised features 1306 which extend from an outer surface of the pipe 1302 and continue in a crosshatched pattern along the pipe 1302. The raised features 1306 run in circumferential and axial directions relative to the central axis. Similarly to those shown in FIG. 9, the raised features of FIG. 10 comprise a triangular cross-sectional profile. However, as mentioned above, many different profiles of raised feature (and/or fiber volume fractions) may be utilised to give the raised features a desired impact resistance/sensitivity.

FIGS. 11 and 12 illustrate an injection moulding process for manufacturing a monolithic fiber-reinforced polymer composite component such as those shown in FIGS. 1-10.

As shown in FIG. 11, a first mould portion 202 and a second mould portion 204 are brought together to form a complete mould 206. The complete mould 206 comprises a main cavity 208 and a plurality of additional cavities 210 that extend from the main cavity 208. Although it is not shown in this example, the main cavity 208 and/or additional cavities 210 may comprise additional shapes and/or features to form corresponding features on the resulting component (e.g. a boss in main cavity 208 may be used to form a corresponding through-hole in the resultant connector).

An injection tool 216 comprising a chamber 218 and a screw 220 is used to inject molten thermoplastic polymer 222 containing chopped fiber reinforcement (not shown) into the mould 206. The injection tool 216 is heated to melt the thermoplastic polymer 222 (e.g. provided as solid pellets) and the screw 220 is rotated to force the molten thermoplastic polymer 222 and its chopped fiber reinforcement into the mould 206 such that it fills the main and additional cavities 208, 210.

As the polymer 222 is injected, it fills the main cavity 208, flowing in a primary flow direction 224. The additional cavities 210 extend from the main cavity 208 in a direction perpendicular to the primary flow direction 224 (i.e. radially), with an opening dimension 226 in a direction parallel to the primary flow direction (i.e. the additional cavities extend from the main cavity via an opening with a certain width).

The opening dimension 226 is selected to be no more than ten times the average length of the chopped fiber reinforcement (e.g. an opening dimension of 1.6 mm for an average fiber length of 200 microns). Because the polymer 222 has to deviate from the primary flow direction 224 and pass through this limited opening to fill the additional cavities 210 it carries less of the chopped fiber reinforcement into the additional cavities 210. As a result, the polymer 222 that fills the main cavity 208 has a first volume fraction of chopped fiber reinforcement and the polymer 222 that fills the additional cavities 210 has a second, lower volume fraction of chopped fiber reinforcement.

Once the cavities 208, 210 have been filled with the chopped fiber reinforced thermoplastic polymer 222, the mould 206 and its contents is allowed to cool (this may in some examples involve active cooling elements that are not shown in FIG. 11 or 12) and the injected thermoplastic polymer 222 solidifies to form a fiber-reinforced polymer composite connector 228 (shown in FIG. 12). The resulting fiber-reinforced polymer composite connector 228 has a main portion 230, corresponding to the main cavity 208, and a plurality of raised features 232, corresponding to the additional cavities 210.

The connector 228 may then be extracted easily from the mould 206 for example, by splitting the second mould portion 204 along the line 234 and then sliding the connector 228 off the first mould portion 202.

FIG. 13 shows a close-up cross-sectional view of an FRP composite component 302 (such as the components described above) comprising a raised feature 306 with a different fiber volume fraction to that of the main portion 304. The raised feature 306 extends from a surface plane s of the main portion 304, both produced from a thermoplastic polymer 308 reinforced with chopped fibers 310 using an injection moulding process such as that described above with reference to FIGS. 11 and 12. The raised feature 306 comprises a substantially triangular cross-sectional profile, extending from a base 306a adjacent the surface plane s to a narrower tip 306b that defines a maximum height above the surface plane s of the main portion 304.

Although all the chopped fiber reinforcement 310 in FIG. 13 is schematically shown as fibers with substantially the same length, this is only for ease of illustration and in reality the lengths of the chopped fibers 310 may vary.

The raised feature 306 extends from the surface plane s of the main portion 304 in a direction perpendicular to a primary flow direction 324 of the injection moulding process. Due at least partially to the geometry of the raised portion 306 and the average fiber length/fiber length distribution of the chopped fiber reinforcement 310, the injection moulding process produces a fiber volume difference between the main portion 304 and the raised feature 306.

In this example, the main portion 304 comprises a first fiber volume fraction 312 of approximately 30% (some minor variation may occur across the width of the raised portion 306) and the raised feature 306 comprises a second fiber volume fraction 314 of approximately 20% on average (i.e. lower than the first fiber volume fraction 312). The fiber volume fraction in the base 306a of the raised feature 306 may be slightly different to that in the tip 306b but both are significantly lower than the first fiber volume fraction 312, such that the effective fiber volume fraction difference is a step change between the first volume fraction 312 in the main portion 304 and the second volume fraction 314 in the raised feature 306.

Although the present disclosure has been described with reference to various examples, it will be understood by those skilled in the art that various changes in form and detail may be made without departing from the scope of the disclosure as set forth in the accompanying claims.

The invention claimed is:

1. A fiber-reinforced polymer composite component formed from a polymer matrix material containing fiber reinforcement, the component comprising:
a tubular main portion having a central axis, an internal surface and an external surface, and at least one raised feature extending from the external surface and running entirely around the external surface in a helical or circumferential direction relative to the central axis a surface plane of said main portion, said main portion and said at least one raised feature comprising polymer matrix material containing fiber reinforcement;
wherein the at least one raised feature is exposed to impacts on the external surface of the tubular main portion and arranged to incur visually perceptible damage when the component is subject to an impact with an energy above a predetermined impact energy threshold and to resist an impact with an energy below the predetermined impact energy threshold;
wherein the at least one raised feature has a height above the surface plane and the main portion has a thickness below the surface plane at a position aligned with the at least one raised feature, the thickness and the height being measured from a cross-section taken through the surface plane;
wherein the height is the same as or greater than the thickness; and
wherein the fiber reinforcement is chopped fiber reinforcement.

2. The component of claim 1, wherein the predetermined impact energy threshold is set by the at least one raised feature having a predetermined shape.

3. The component of claim 1, wherein the at least one raised feature has a cross-sectional profile defined in a cross-section taken through the surface plane, and wherein the cross-sectional profile extends away from a base adjacent the surface plane in a converging shape having a tip that defines a maximum height above the surface plane.

4. The component of claim 3, wherein the tip has a radius of curvature that is less than a base width of the at least one raised feature at the surface plane.

5. The component of claim 1, wherein the at least one raised feature has a cross-sectional profile defined in a cross-section taken through the surface plane, the cross-sectional profile being generally triangular.

6. The component of claim 1, wherein the at least one raised feature has a cross-sectional profile defined in a cross-section taken through a surface plane of the main portion, the cross-sectional profile having an aspect ratio greater than one.

7. The component of claim 1,
wherein the at least one raised feature has a cross-sectional profile defined in a cross-section taken through a surface plane of the main portion, the cross-sectional profile having an angle measured from the surface plane that is at least 30°.

8. The component of claim 1, wherein the main portion has a thickness below the surface plane, and wherein the at least one raised feature has a base width at the surface plane, the thickness and the base width being measured from a cross-section taken through the surface plane, and wherein the base width is at least half the thickness.

9. The component of claim 1,
wherein the at least one raised feature comprises a cross-sectional profile that is selected to achieve a predetermined volume fraction of fiber in the at least one raised feature that is different to a volume fraction of fiber in the main portion.

10. The component of claim 1,
wherein the main portion comprises a first volume fraction of fiber reinforcement and the at least one raised feature comprises a second, different volume fraction of fiber reinforcement, the second volume fraction being less than the first volume fraction.

11. The component of claim 1, wherein the component is monolithic.

12. The component of claim 1, made by an injection moulding process.

13. The component of claim 1, wherein the predetermined impact energy threshold is an impact energy below that at which the main portion would incur visually perceptible impact damage.

14. The component of claim 1, comprising a plurality of different raised features having different impact energy thresholds.

15. A fiber-reinforced polymer composite component formed from a polymer matrix material containing fiber reinforcement, the component comprising:
a tubular main portion having a central axis, an internal surface and an external surface, and at least one raised feature extending from the external surface and running entirely around the external surface in a helical or circumferential direction relative to the central axis a surface plane of said main portion, said main portion and said at least one raised feature comprising polymer matrix material containing fiber reinforcement;
wherein the at least one raised feature is exposed to impacts on the external surface of the tubular main portion and arranged to incur visually perceptible damage when the component is subject to an impact with an energy above a predetermined impact energy threshold and to resist an impact with an energy below the predetermined impact energy threshold;
wherein the at least one raised feature has a height above the surface plane and the main portion has a thickness below the surface plane at a position aligned with the at least one raised feature, the thickness and the height being measured from a cross-section taken through the surface plane;
wherein the height is the same as or greater than the thickness; and
wherein the at least one raised feature extends over 30% or less of the surface plane of the main portion by area.

16. A fiber-reinforced polymer composite component formed from a polymer matrix material containing fiber reinforcement, the component comprising:
- a tubular main portion having a central axis, an internal surface and an external surface, and at least one raised feature extending from the external surface and running entirely around the external surface in a helical or circumferential direction relative to the central axis a surface plane of said main portion, said main portion and said at least one raised feature comprising polymer matrix material containing fiber reinforcement;
- wherein the at least one raised feature is exposed to impacts on the external surface of the tubular main portion and arranged to incur visually perceptible damage when the component is subject to an impact with an energy above a predetermined impact energy threshold and to resist an impact with an energy below the predetermined impact energy threshold;
- wherein the at least one raised feature has a height above the surface plane and the main portion has a thickness below the surface plane at a position aligned with the at least one raised feature, the thickness and the height being measured from a cross-section taken through the surface plane;
- wherein the height is the same as or greater than the thickness; and
- wherein the at least one raised feature extends over 20% or less of the surface plane of the main portion by area.

\* \* \* \* \*